UNITED STATES PATENT OFFICE.

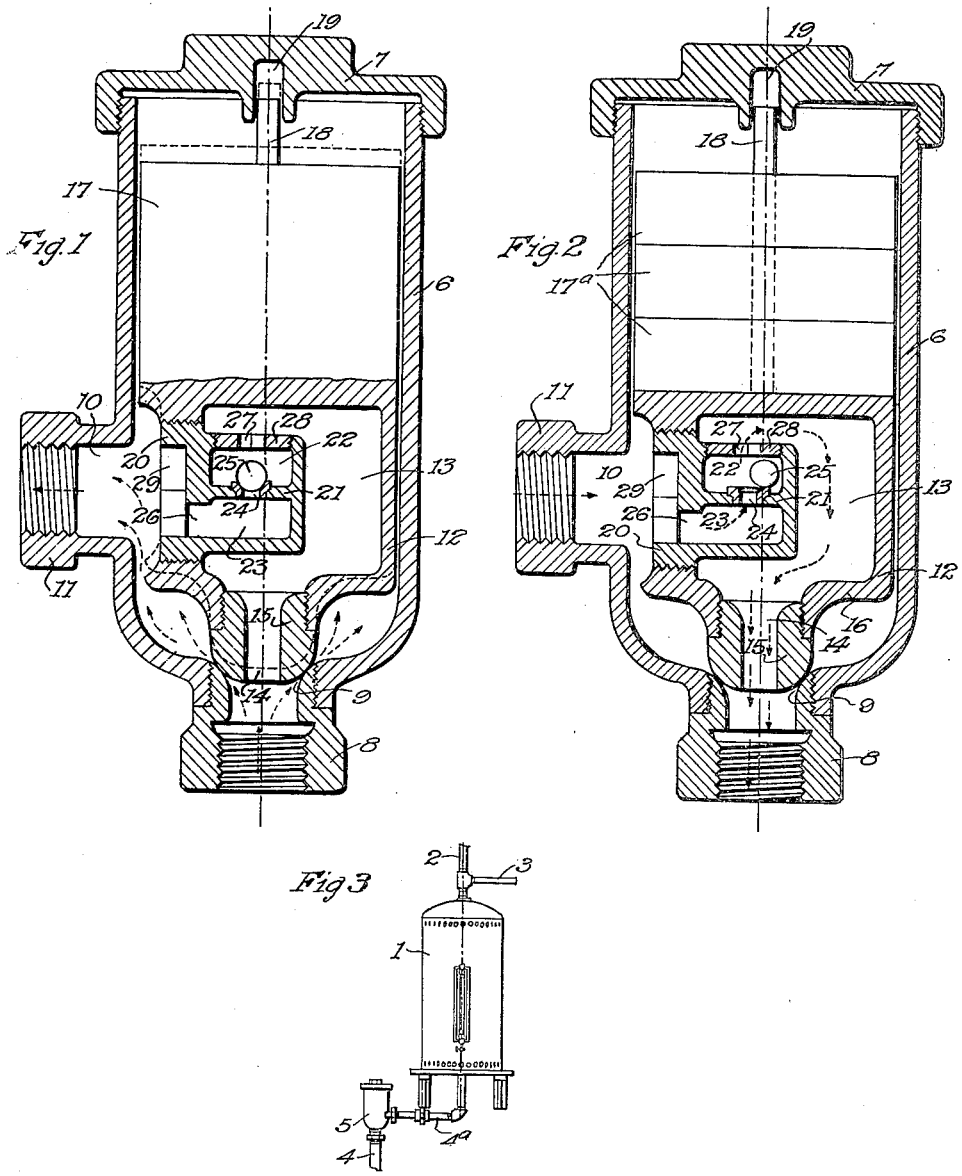

NEWLAND E. FROST, OF CHICAGO, ILLINOIS, ASSIGNOR TO JAMES B. CLOW & SONS, OF CHICAGO, ILLINOIS, A CORPORATION.

PRESSURE-REGULATOR FOR HOT-WATER HEATING SYSTEMS.

1,126,189. Specification of Letters Patent. Patented Jan. 26, 1915.

Application filed December 15, 1913. Serial No. 806,827.

*To all whom it may concern:*

Be it known that I, NEWLAND E. FROST, a citizen of the United States, residing at Chicago, in the county of Cook and State of Illinois, have invented certain new and useful Improvements in Pressure-Regulators for Hot-Water Heating Systems, of which the following is a specification.

The present invention relates to devices, of that class that are known, to the trade under various more or less arbitrary and fanciful names, being, in fact, devices used in connection with hot-water systems for facilitating the flow or circulation through the system of the water used as a heat circulating medium, or, in other words, as the means or medium for conveying the heat from the furnace or heater to the point or points at which it is desired to make use of it. In connection with a system for the general purposes of heating radiators, for whatever ultimate purpose these radiators may be used, and for affording a supply of hot water at one or more distant points,—either or both,—the system must be open to atmosphere, at some point, in order to afford relief and thereby prevent injury to the system, by the expansion of the water when heated, and usually this relief is afforded by connecting the system, at some point, with an elevated expansion tank which is open to atmosphere. In a system having such an expansion tank, as the temperature of the water increases, its natural tendency is to take the course of least resistance and flow into the expansion tank.

The object of the device embodying the present invention and, in fact the object of all devices of the same general class, is to resist or prevent the water from flowing to the expansion tank until the pressure within the system reaches a predetermined point— say the maximum pressure under which the system may be operated with safety. Here it may be stated that I do not claim to be the first to provide a device, or regulator intended to accomplish this result, the general object of the present invention being to provide a regulator, of this class, of improved construction. More particularly stated the objects of the invention are to provide a regulator which, first and foremost, is efficient; that has but few parts of simple construction, wherefore it is not liable to get out of order and is of comparatively low cost; that may be easily and quickly incorporated in systems already in use; that affords easy access to all of its internal parts for cleaning purposes or for renewing such parts as may become worn out without the necessity for breaking or opening up the connection between the regulator and the system; that operates automatically, solely under the influence of gravity, and that requires no adjustment as to pressure.

To these ends the invention consists in the features of novelty that are hereinafter described with reference to the accompanying drawing, which is made a part of this specification and in which—

Figures 1 and 2 are vertical central sections of the improved regulator, with its valves in different positions, depending upon the pressure within the system. In Fig. 2, a modification in the construction of one of the parts is shown. Fig. 3 is an outline elevation on a small scale showing the preferred relation of the improved regulator to the ordinary expansion tank.

Referring first to Fig. 3, 1 represents an expansion tank having at the top the customary vent and overflow, 2 and 3, respectively. Communicating with this tank is a pipe, 4—4ª, (herein called the "expansion pipe") which may communicate with the system at any desired point in customary manner, and here it may be stated that the term "system" as herein used comprehends the boiler as a part of it. Preferably the improved regulator is incorporated in this expansion pipe, and is located adjacent to the expansion tank as shown at 5, but this is not essential and within the scope of the present invention it may be incorporated in or connected with any desired part of the system so long as there is a pipe similar to the branch 4ª, of the expansion pipe which rises above the regulator and is itself of sufficient capacity, or else communicates with a tank of sufficient capacity to contain the water displaced by the expansion within the system. But these are details with which the invention, in its broadest aspects, is not concerned.

The regulator itself has a shell, 6, preferably cast iron, of generally cylindrical shape, the upper end of which is open and externally screw threaded for engagement with a correspondingly threaded cap, 7, by which the shell is normally closed but may be readily opened to give free access to its contained parts. The lower end of the shell is contracted and provided with a threaded opening into which is screwed a correspondingly threaded annular fitting, 8, preferably of cast brass, the upper end of which is shaped to form a valve seat, 9, the lower end of said fitting, 8, being internally threaded for connection with the upper end of the expansion pipe, 4. The shell is also provided, preferably at a level above its bottom with a lateral opening, 10, surrounded by a lateral projection, 11, which is internally threaded for receiving the lower end of the rises pipe, 4ª, which latter is, in fact, an upward continuation of the expansion pipe, 4.

Within the casing is a hollow, weighted valve device, 12, which operates in conjunction with the valve seat, 9, for controlling the flow of water to and from the riser pipe, 4ª, in response to variations in expansion and contraction. This valve device has a chamber, 13, which is in constant communication with the expansion pipe, 4, through a port or passage 14, provided by an annulus or short tubular plug, 15, preferably made of vulcanite or any other suitable material, which plug is screwed into an opening formed through the bottom wall, 16, of the chamber, 13, and its lower end shaped to form the main valve proper, which is adapted to coöperate with the valve seat, 9. In practice the walls of this chamber are preferably cast integrally with a cylindrical mass or body, 17, as shown in Fig. 1, the sole purpose of which is to add weight to the main valve, and this body, 17, may therefore be properly called a weight whether it is in one piece and integral with the walls of the chamber, 13, or in a number of separate pieces, 17ª, formed separately from the walls of the chamber, 13, as shown in Fig. 2. Or the parts, 15, 16 and 17, or 17ª, may be regarded as a weighted valve, having a chamber, 13, and a port or opening, 14, communicating therewith and extending through its working face, and this terminology is adapted for the purposes of this application. Rising vertically from the top of this weighted valve is a guide stem, 18, which projects into a guiding socket, 19, in the under side of the cap, 7.

One of the side walls of the chamber, 13, is provided with a threaded opening in which is screwed the housing, 20, of an outwardly seating check valve by which is meant a valve that will be seated, automatically by pressure against it from within the chamber, 13. The housing, 20, is a hollow casting preferably of general cylindrical shape having within it a web, 21, which divides its interior into two chambers, 22 and 23, the former of which is in constant communication with the chamber, 13, and consequently with the expansion pipe, 4, while the latter is in constant communication with interior of the shell, 6, and consequently with the riser pipe, 4ª, the two chambers being in communication with each other through a port, 24, formed through the web, 21, and under the control of a check valve, 25, which is preferably in the form of a ball of greater specific gravity than water. The communication between the chamber, 23, and shell, 6, is through a port, 26, formed through one of the side walls of the chamber, 23, and communication between the chamber, 22, and chamber, 13, is through a port, 27, formed through a peripherally threaded disk, 28, which forms the top wall of the chamber, 22, said port being of non-circular shape for the reception of a tool or implement by which it may be turned in order to screw it to the main part of the check-valve housing. For a similar purpose the end of this housing is provided with a non-circular depression, 29, whereby it may be screwed into place and supported within the chamber, 13.

With a regulator thus constructed it will be understood that water can not flow to the expansion tank until the pressure due to expansion in the system overcomes the resistance of the weight—or weighted valve, because the check valve, 25, effectually prevents the flow of water from the chamber, 13, to the interior of the shell, through the port, 26. But as soon as this pressure is reached, (the check valve still remaining seated) it will lift the weighted valve from its seat, 9, and permit water to flow from the expansion pipe, 4, into the interior of the shell and thence out, through the opening, 10, to the riser pipe, 4ª, as indicated by the dotted arrows in Fig. 1. When, however, the pressure within the system becomes less than the resistance of the weighted valve, the column of water in the riser pipe, acting upward against the under side of the check valve will, by reason of its weight, unseat the check valve and flow into the casing, 6, thence through the port, 26, into the chamber, 23, thence through the port, 24, into the chamber, 22, thence through the port, 27, into the chamber, 13, thence through the passage, 14, into the expansion pipe, as indicated by the arrows in Fig. 2, and thence back to the system. A weight for holding to its seat the valve for controlling the flow of water to the expansion tank has many advantages over a spring for the same purpose and among these advantages may be mentioned that it is constant—never varying—it requires no adjustment and therefore does not depend upon the discretion, or rather the want of discretion on the part of a workman (in other words it is "fool proof") and may be made before it leaves the factory to exactly meet the requirements of the system in which it is to be used. Another advantageous feature of a regulator having a shell constructed as above described is that, should it become necessary to clean or repair any part of the valve device the only parts that can possibly need repair or cleaning can be easily and quickly removed and replaced without disconnecting the entire regulator from the piping. Still other advantageous features of a regulator constructed as above described are that it is entirely automatic in its operation; it has but few parts all of very simple construction; it is not liable to get out of order, and it can be made at a comparatively low cost.

What I claim as new is:—

1. A pressure regulator of the class described having, in combination, a hollow shell having an opening adapted to communicate with a riser pipe, and having also a second opening adapted to communicate with an expansion pipe extending from the system, a valve seat surrounding the opening last aforesaid, and a valve device located within the shell, said valve device having a weight provided with an internal chamber, one wall of which has through it an opening adapted to communicate with the expansion pipe and an annular valve surface surrounding said opening and adapted to said valve seat, one of the walls of said weight chamber having through it an opening communicating directly with the interior of the shell, a hollow housing for a check valve secured in said opening and projecting into the chamber of the weight, said housing having an internal web dividing its interior into two chambers, said web having through it a port or opening through which said chambers communicate, one wall of one of said chambers of the check valve housing having through it a port communicating with the chamber of the weight and one wall of the other of said two chambers of the check valve housing having through it a port communicating with the interior of the shell, and a check valve located in one of said two chambers and adapted to control the opening or port through which they communicate.

2. A regulator of the class described having, in combination, a hollow shell having an opening adapted to communicate with a riser pipe, and having also a second opening formed through its bottom, adapted to communicate with an expansion pipe extending from the system, a valve seat surrounding the opening last aforesaid, and a valve device located within the shell, said valve device having a weight having an internal chamber, the bottom wall of said chamber having an opening through it, a tubular plug secured in said opening and shaped to form a valve surface adapted to said valve seat, one of the side walls also of said chamber having an opening through it, a housing for a check valve secured in the opening last aforesaid and projecting into said chamber, said housing consisting of a hollow casting having an internal web dividing its interior into two chambers and having through it a port, or opening, through which said chambers communicate, one wall of one of said chambers having through it a port communicating with said chamber and with the interior of the shell, and one wall of the other of said chambers having through it a port or opening through which the chamber last aforesaid communicates with the chamber of the weight, a check valve located in the chamber last aforesaid of the housing and adapted to control the port through which the chambers communicate, said housing having an opening for the insertion of the ball check valve and a removable closure for said opening.

NEWLAND E. FROST.

Witnesses:
  PAUL WEED,
  F. J. HIGGINBOTHAM.

Copies of this patent may be obtained for five cents each, by addressing the "Commissioner of Patents, Washington, D. C."